United States Patent
Stagg (10) Patent No.: US 7,865,471 B1
(45) Date of Patent: Jan. 4, 2011

(54) APPARATUS AND METHOD FOR ACCELERATING DATABASE RECOVERY

(75) Inventor: Michael R. Stagg, Lino Lakes, MN (US)

(73) Assignee: Symantec Operating Corporation, Mountain View, CA (US)

( * ) Notice: Subject to any disclaimer, the term of this patent is extended or adjusted under 35 U.S.C. 154(b) by 204 days.

(21) Appl. No.: 11/478,811

(22) Filed: Jun. 30, 2006

(51) Int. Cl.
    *G06F 17/30* (2006.01)
    *G06F 7/00* (2006.01)
    *G06F 17/00* (2006.01)

(52) U.S. Cl. .................................. 707/640; 707/661
(58) Field of Classification Search ....................... None
See application file for complete search history.

(56) References Cited

U.S. PATENT DOCUMENTS

| | | | | |
|---|---|---|---|---|
| 5,778,387 A * | 7/1998 | Wilkerson et al. | ............ | 707/202 |
| 5,933,838 A * | 8/1999 | Lomet | ......................... | 707/202 |
| 6,173,292 B1 * | 1/2001 | Barber et al. | ............... | 707/200 |
| 6,732,124 B1 * | 5/2004 | Koseki et al. | ............... | 707/202 |
| 6,857,053 B2 * | 2/2005 | Bolik et al. | ................... | 711/162 |
| 6,922,754 B2 * | 7/2005 | Liu et al. | ...................... | 711/138 |
| 7,376,866 B1 * | 5/2008 | Sarma | .......................... | 714/16 |
| 2003/0074600 A1 * | 4/2003 | Tamatsu | ......................... | 714/6 |
| 2003/0093444 A1 * | 5/2003 | Huxoll | ......................... | 707/204 |
| 2005/0278393 A1 * | 12/2005 | Huras et al. | ................... | 707/202 |
| 2006/0117074 A1 * | 6/2006 | Ezzat | ............................ | 707/202 |
| 2007/0033356 A1 * | 2/2007 | Erlikhman | .................... | 711/162 |

* cited by examiner

*Primary Examiner*—Yicun Wu
(74) *Attorney, Agent, or Firm*—Campbell Stephenson LLP (57) ABSTRACT

A method of recovering a target data object. In one embodiment, the method includes restoring the target data object to a data state that existed at a point of time prior. Once the target data object is restored, a first object is retrieved from backup memory, wherein the first object comprises a plurality of transactions for modifying the target data object. After the target data object is restored, the target data object is modified in accordance with the transactions of the first object. A second object is retrieved from backup memory, wherein the second object comprises a plurality of transactions for modifying the target data object. The second object is retrieved from backup memory before the target data object is modified in accordance with all of the transactions of the first object.

21 Claims, 4 Drawing Sheets

APPARATUS AND METHOD FOR ACCELERATING DATABASE RECOVERY

BACKGROUND

Data objects (e.g., databases, file systems, files within a file system, etc.) are typically stored on memory devices such as hard disks. Data objects, however, are subject to data corruption as a result of hardware, software, or human error. Moreover, hard disks fail at the worst of times and take all data objects stored on them with them when they go. These problems have motivated the creation of data object recovery systems. The present invention will be described with reference to the recovery of a corrupted database, it being understood that the present invention should not be limited thereto.

Figure 1:
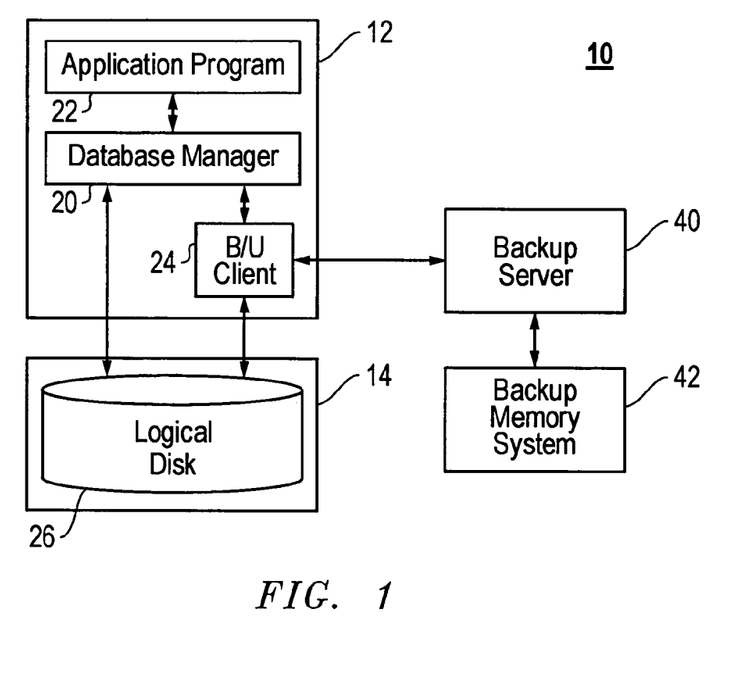
FIG. 1 is a block diagram illustrating relevant components of a data processing system.

In general, database recovery systems recover a database to a known, consistent data state that existed just prior to an event (e.g., an inadvertent deletion of a record in a database) that caused the corruption. FIG. 1 illustrates in block diagram form, relevant components of a data processing system 10 which employs an exemplary database recovery mechanism. FIG. 1 and its description should not be considered prior art to the claims below.

Data processing system 10 includes a computer system (e.g., a server) coupled to a data storage system 14. Computer system 12 includes a database manager 20 coupled to an application program 22, and a backup client 24. Each of the components 20-24 may take form in computer program instructions executing on one or more processors of computer system 12.

Data storage system 14 consists of a plurality of memory devices (e.g., disk arrays) that are logically aggregated to create a logical disk 26, which in turn stores a file system containing files accessible by database manager 20 and backup client 24. The file system on logical disk 26 stores a file (not shown) containing exemplary Database A. While the present invention will be described with reference to recovering Database A after corruption, the present invention may also be employed to recovery two or more corrupted databases, or one corrupted database amongst several uncorrupted databases. Although FIG. 1 shows database manager 20 and backup client 24 coupled directly to logical disk 26, the term coupled should not be limited thereto; database manager 20 and backup client 24 could be coupled indirectly to logical disk 26 via a file system manager and a volume manager (not shown).

As will be more fully described below, database manager 20 employs backup client 24 when implementing a database recovery process. Backup client 24 is in data communication with backup server 40, which in turn is coupled to backup memory system 42. For purposes of explanation only, backup memory system 42 includes a robotic tape handler (not shown) having access to several magnetic tapes (hereinafter "backup tapes") upon which backup copies of Database A and transaction log extents (more fully described below) are stored. Further, backup memory system 42 includes one or more tape drives into which backup tapes are inserted by the robotic tape handler. Inserting a backup tape into a tape drive is often referred to herein as mounting the tape. A backup tape can be read only when it is mounted. In another embodiment, backup memory system 42 may include one or more disk arrays that can be aggregated to form a logical backup disk on which backup copies can be stored.

Database manager 20 generates database transactions in response to receiving instructions from application program 22. Database transactions, when implemented or committed, modify or add to the contents of Database A. Database manager 20 also creates database transaction log extents into which database transactions are logged in the order they are generated. The database transactions are logged before being committed. Logged transactions are committed to Database A either when resources are available or when scheduled.

In one embodiment, transaction log extents are formed as files within a directory TL of the file system on disk 26. Database transactions, when generated, are logged to the most recently created transaction log extent. Once a transaction log extent is filled with transactions, database manager 20 creates a new extent to store subsequently generated transactions. The first transaction log extent created by database manager 20 is designated TLE1. The subsequently generated transaction log extents are sequentially designated TLE2, TLE3, etc. The first transaction generated by database manager 20 is designated T1. Subsequently generated transactions are sequentially designated T2, T3, etc.

Figure 2A:
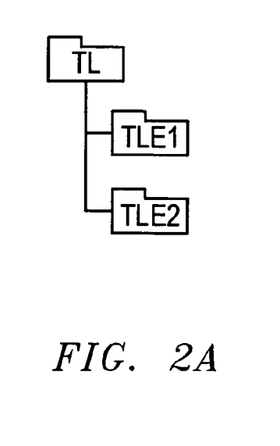
FIG. 2A graphically illustrates a pair of transaction log extents stored in respective files of a file system.
Figure 2B:
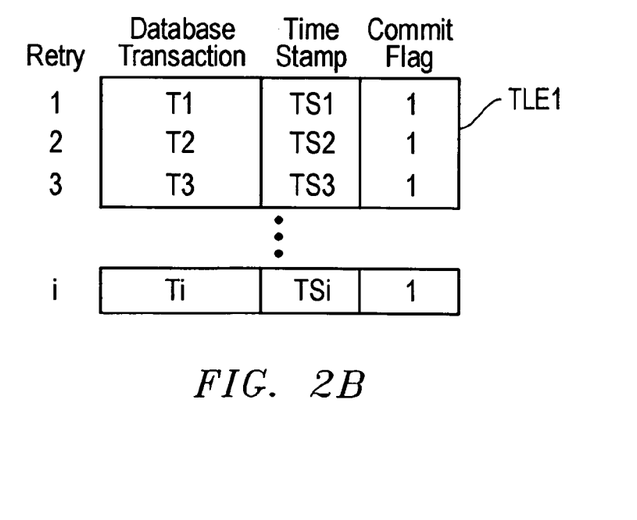
FIG. 2B graphically illustrates relevant aspects of one of the transaction log extents shown in FIG. 2A.

FIG. 2A illustrates a graphical representation of directory TL stored on the file system of disk 26. Directory TL includes the first two transaction log extents TLE1 and TLE2 created by database manager 20. FIG. 2B illustrates relevant contents of an exemplary transaction log extent TLE1. It should be understood the present invention should not be limited to using transaction log extents exemplified in FIG. 2A. Rather, database transactions can be logged to transaction log extents with a structure different than that shown in FIG. 2B, or in a data object other than a transactions log extent such as that shown in FIG. 2A.

TLE1 shown in FIG. 2B contains i entries. Each entry includes a logged database transaction (e.g., T3), a time stamp, and a commit flag. When database manager 20 generates a transaction, the transaction is logged to the next available entry within a transaction log extent such as TLE1 shown in FIG. 2B. When a transaction is first logged within an entry of a transaction log extent, the commit flag for the entry is initially set to logical zero. Once that transaction is committed to Database A, the commit flag is switched to logical one. Further, when the logged transaction is committed to Database A, the time at which the transaction is committed is entered as the time stamp within the transaction log extent entry for that transaction.

Backup client 24 operating in conjunction with backup server 40, performs backup operations at regularly scheduled times (e.g., nightly at 2:00 AM). As will be more fully described below, backup operations may be full or incremental. In a full backup operation, a backup copy of Database A is created and stored on one or more backup tapes within backup memory system 42. For purposes of explanation only, it will be presumed that a backup of Database A can be created and stored on a single backup tape. Additionally, a copy of each transaction log extent in directory TL is created and stored on a backup tape within backup memory system 42 during each full backup operation. During incremental backup operations, a backup copy of each transaction log extent contained in directory TL is created and stored on a backup tape within backup memory system 42. The contents of the file containing Database A is not copied to a backup tape during an incremental backup operation. After each incremental or full backup operation, database manager 20 removes each transaction log extent from directory TL, regardless of whether the transaction log extent is completely filled with logged transactions.

Incremental backup operations take less time to complete when compared to full backup operations since, in most cases, the quantity of data stored within transaction log extents on directory TL is small when compared to the quantity of data contained within Database A. As such, incremental backup operations are preferred over full backup operations since the backup window (i.e., the time needed to perform the backup operation) maybe small. The present invention will be described with full backup operations scheduled for once a week (e.g., Sunday at 2:00 AM), and incremental backup operations scheduled daily, except for the day when a full backup operation is performed.

If Database A is the subject of a data corrupting event, backup copies of Database A and transaction log extents are used by database manager 20 to restore Database A to a known, consistent data state that existed prior to the corrupting event. In the recovery process, Database A is initially restored to the state it occupied at a point in time prior to the corrupting event and when a full backup operation was performed. In other words, Database A stored on disk 26 is replaced with backup copy BCA(T) stored on a backup tape, where BCA(T) is the backup copy of Database A created at time T before time TE, the time of the corrupting event. Thereafter, transactions logged after creation of backup copy BCA(T) and before TE, are replayed (or recommitted). Before the database recovery process begins, database manager 20 will identify Tm as the first logged transaction to be replayed after Database A is restored to BCA(T). Logged transactions beginning with Tm are replayed in order until Database A is recovered to a known, consistent state that occurred just prior to time TE. Logged transactions can be replayed so long as the logged transactions are contained in a transaction log extent on directory TL. As noted above, however, database manager 20 removes transaction log extents from directory TL after each full or incremental backup operation. If database manager 20 discovers that a needed transaction log extent is not available on directory TL during the database recovery process, database manager 20 can request backup client 24 to restore the needed transaction log extent to directory TL as will be more fully described below.

Figure 3:
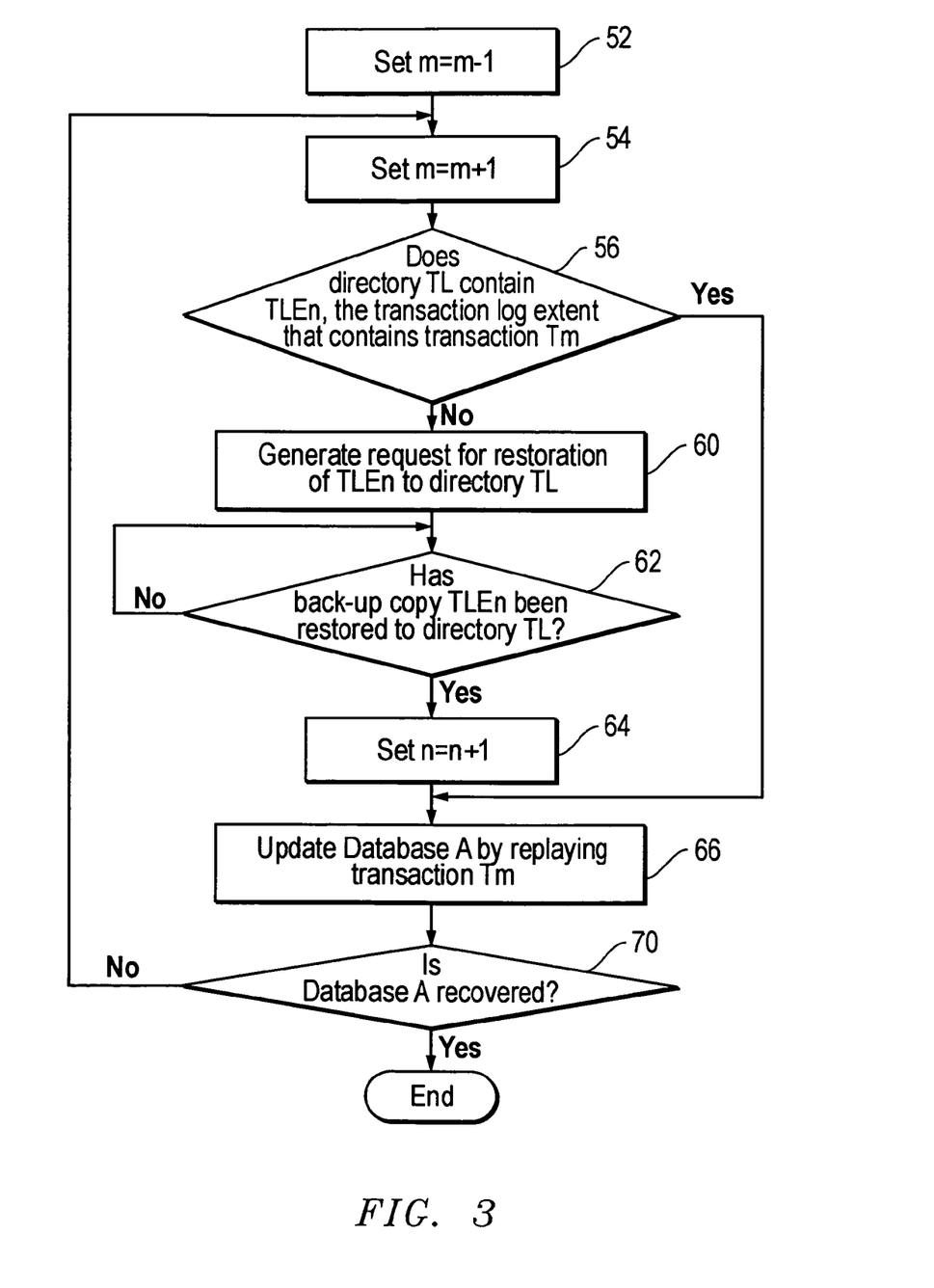
FIG. 3 illustrates relevant aspects of a database recovery process implemented by the database manager of FIG. 1.

FIG. 3 illustrates relevant, operational aspects of an exemplary database recovery mechanism implemented by database manager 20. The process shown in FIG. 3 is implemented after backup client 24, operating in conjunction with backup server 40, restores Database A to the data state it occupied at time T. At step 52, database manager 20 sets variable m to m−1, where m is identified by database manager 20 as the number of the first logged transaction to be replayed.

In step 54, database manager 20 increments m by 1. Thereafter, database manager 20 determines whether directory TL on disk 26 contains TLEn, the transaction log extent that, in turn, contains transaction Tm. If transaction log extent TLEn is stored on disk 26 under directory TL, the process proceeds to step 66 where Database A is updated or modified by replaying transaction Tm. However, if directory TL does not contain transaction log extent TLEn, the transaction log extent must be restored to directory TL, and the process proceeds to step 60 where database manager 20 generates a request for restoration of transaction log extent TLEn. Database manager 20 sends the request generated in step 60 to backup client 24, and the recovery process enters a pause mode defined by step 62. More particularly, the database recovery process pauses until database manager 20 receives confirmation from backup client 24 that transaction log extent TLEn has been restored to directory TL. Once restoration of TLEn is confirmed by backup client 24, database manager 20 increments n by 1 as shown in step 64, and Database A is updated by replaying transaction Tm in step 66. After replaying transaction Tm, the process proceeds to step 70 where database manager 20 determines whether Database A has been recovered to the known, consistent state that existed prior to data corruption. In one embodiment, the time stamps of the transaction log extent entries can be used to determine whether Database A has been recovered. The time stamp for each transaction replayed can be compared to time TC, the time at which Database A was in a known, consistent state just before data corruption. If the time stamp of the most recently replayed transaction equals time TC, Database A is considered recovered, and the process of FIG. 3 ends.

As noted in FIG. 3, database manager 20 in step 60 generates one or more requests for restoration of transaction log extent TLEn to directory TL. Each of these requests is received by backup client 24. For each request received by backup client 24, backup client 24 generates a corresponding request for the backup copy of transaction log extent TLEn. Backup client 24 sends the corresponding request to backup server 40. Software executing on backup server 40, in response to receiving the corresponding request from client 24, accesses a catalog or other stored information to identify the backup tape that stores the requested transaction log extent (i.e., the backup copy of TLEn). Once the appropriate tape is identified, backup server instructs the robotic tape handler to insert the identified tape into a tape drive of backup memory system 42. The catalog mentioned above, also identifies the location on the backup tape where the requested transaction log extent can be found. Once mounted, the backup tape is forwarded to the position where the requested transaction log extent can be read. Thereafter, a read/write head reads the requested transaction log extent as the tape is further forwarded. The backup copy of TELn is subsequently provided to backup client 24 via backup server 40. Backup client 24 in turn adds the backup copy of TLEn to directory TL on logical disk 26. Backup client 24 then informs database manager 20.

As noted, the database recovery process of FIG. 3 pauses each time database manager 20 generates a request for restoration of transaction log extent TLEn to directory TL. Each request may require a substantially amount of time to complete since (1) software executing on backup server must identify the appropriate backup tape that contains the requested transaction log extent in addition to the tape position where the beginning of the requested transaction log extent can be found, (2) the robotic tape handler must insert the identified tape into a tape drive of backup memory system 42 if the identified tape is not already mounted, (3) the mounted tape is forwarded to the position where the desired transaction log extent copy can be read, and (4) the tape is further forwarded while the read/write head of the tape drive reads the requested transaction log extent from the backup tape. Each transaction log extent restoration using the aforementioned process, adds to the overall time needed to complete the database recovery process of FIG. 3. This is true even in the alternative embodiment mentioned above in which backup memory 42 includes a plurality of disk arrays rather than tapes for storing backup copies since some time is needed, for example, to identify the location in the plurality of disk arrays where the backup copy of the requested transaction log extent can be found.

SUMMARY OF THE INVENTION

A method of recovering a target data object. In one embodiment, the method includes restoring the target data object to a data state that existed at a point of time prior. Once the target data object is restored, a first object is retrieved from backup memory, wherein the first object comprises a plurality of transactions for modifying the target data object. After the target data object is restored, the target data object is modified in accordance with the transactions of the first object. A second object is retrieved from backup memory, wherein the second object comprises a plurality of transactions for modifying the target data object. The second object is retrieved from backup memory before the target data object is modified in accordance with all of the transactions of the first object

BRIEF DESCRIPTION OF THE DRAWINGS

The present invention may be better understood, and its numerous objects, features, and advantages made apparent to those skilled in the art by referencing the accompanying drawings.

The use of the same reference symbols in the drawings indicates similar or identical items.

DETAILED DESCRIPTION

The present invention relates to a method for accelerating database recovery. In one embodiment, the database recovery process is accelerated by prefetching transaction log extents from backup memory while logged transactions, previously fetched from backup memory, are replayed. The prefetched transaction log extents can be temporarily stored in a first directory until needed by the database recovery process. Once needed by the database recovery process, the prefetched transaction log extents can be simply moved from the first directory to a second directory accessible by database manager that implements the recovery process. By prefetching transaction log extents from backup memory, the database recovery process described above should not experience some or all of the delays described above.

In the following description, the preferred embodiment of the present invention can be implemented as a computer program executing on a processor of a computer system such as a server, although those skilled in the art will readily recognize that the equivalent of such software may also be constructed in hardware or a combination of hardware and software. If the invention is implemented as a computer program, the program may be stored in a conventional computer readable medium that may include, for example: magnetic storage media such as a magnetic disk (e.g., a disk drive); optical storage media such as an optical disk; solid state electronic storage devices such as random access memory (RAM), or read only memory (ROM); or any other device or medium employed to store computer program instructions.

Figure 4:
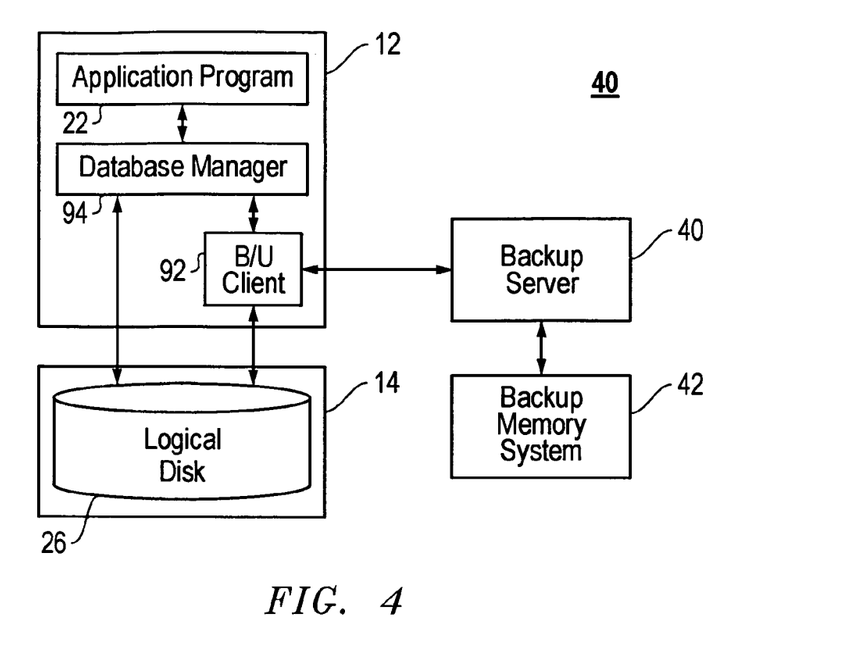
FIG. 4 is a block diagram illustrating relevant components of a data processing system employing one embodiment of the present invention.

FIG. 4 illustrates relevant components of exemplary data processing system 90 employing one embodiment of the present invention. Data processing system 90 is the data processing system 10 shown in FIG. 1 with backup client 24 replaced by backup client 92, and database manager 20 replaced by database manager 94.

Database manager 94 is similar in manner regards to database manager 20. For example, database manager 94 generates database transactions in response to receiving instructions from application program 22 as described in the Background section above. The first transaction generated by database manager 94 is designated T1. Subsequently generated transactions are sequentially designated T2, T3, etc. Database manager 94 creates transaction log extents for logging transactions in the order generated as described in the Background section above. The first transaction log extent created by database manager 94 is designated TLE1. The subsequently generated transaction log extents are sequentially designated TLE2, TLE3, etc. Database manager 94 also implements the database recovery process shown within FIG. 3. Thus, database manager 94 generates individual requests to restore respective transaction log extents to directory TL in accordance with step 60 shown in FIG. 3. These requests are subsequently received by backup client 92.

Backup client 92, in one embodiment, is similar in some regards to backup client 24. Backup client 92 operating in conjunction with backup server 40, operates to create backup copies of Database A at regularly scheduled times (e.g., nightly at 2:00 AM). The backup operations may be full or incremental. In a full backup operation, a backup copy of Database A is created and stored on a backup tape within backup memory system 42. Further, a backup copy of each transaction log extent contained in directory TL is created and stored on a backup tape within backup memory system 42 during each full backup operation. During incremental backup operations, only a backup copy of each transaction log extent contained in directory TL is created and stored on a backup tape within backup memory system 42. The contents of the file containing Database A are not copied to a backup tape during an incremental backup operation. After each incremental or full backup operation, database manager 94 removes each transaction log extent from directory TL, regardless of whether the transaction log extent is completely filled with logged transactions.

Figure 5:
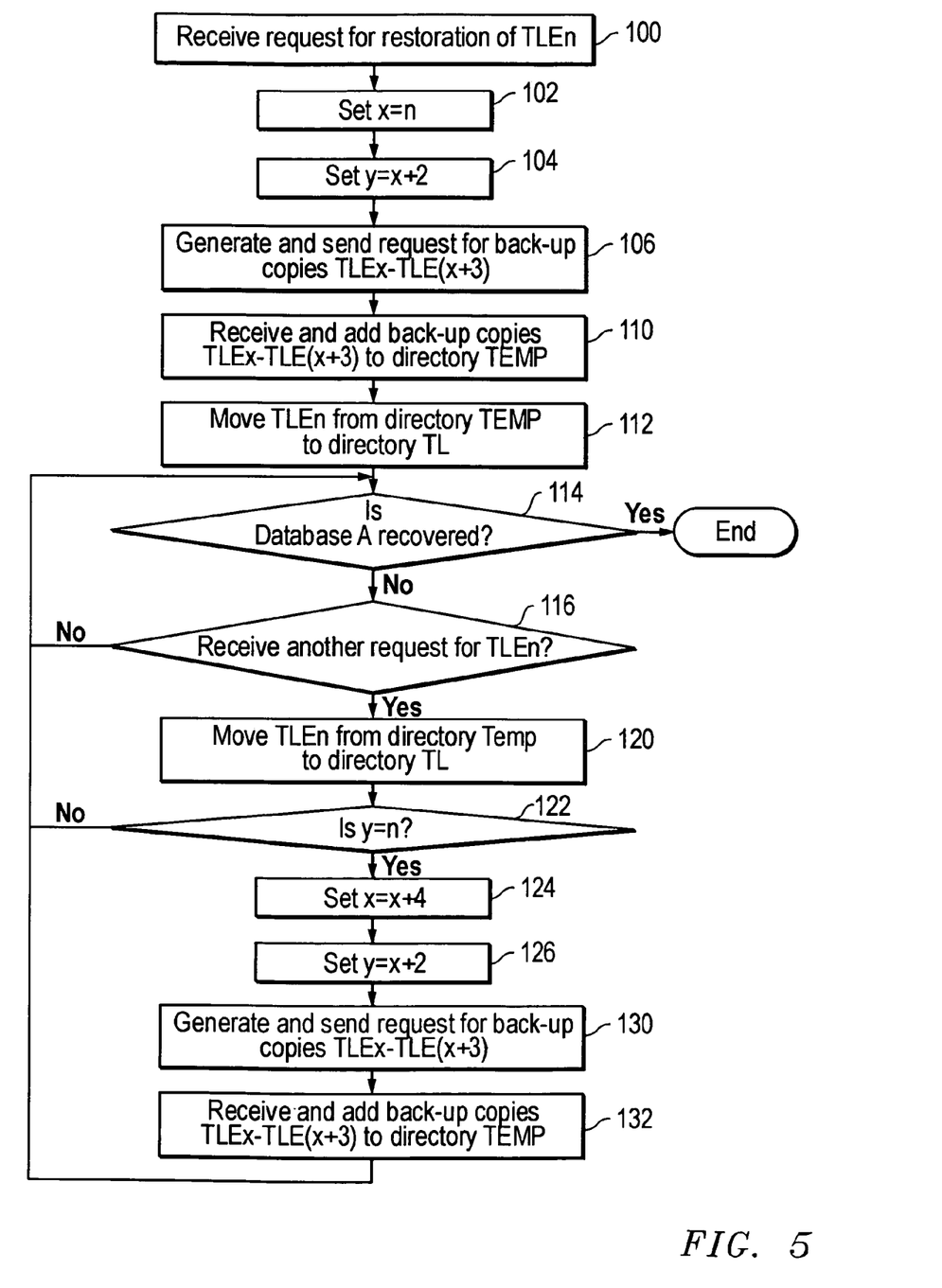
FIG. 5 illustrates relevant aspects of a process for restoring transaction log extents in accordance with one embodiment of the present invention.

Backup client 92, however, implements a transaction log extent restoration process that is substantially different when compared to the transaction log extent restoration process described in the Background section. FIG. 5 illustrates relevant aspects of one embodiment of the transaction log extent restoration process implemented by backup client 92. The process of FIG. 5 starts after a discovery is made that Database A is corrupted, and after Database A is restored on disk 26 to the data state that existed at a prior full backup operation. In other words, Database A stored on disk 26 is replaced with backup copy BCA(T) stored on a backup tape in backup memory system 42, where BCA(T) is the backup copy, of Database A created at prior time T.

With continued reference to FIG. 5, the illustrated process begins when backup client 92 receives the first transaction log extent restoration request (i.e., request to restore transaction log extent TLEn on directory TL) from database manager 94 in step 100. In steps 102 and 104, backup client 92 sets a variable x to n and variable y to x+2. It is noted that variable y could be set x+z, where z is any predetermined number. Although not shown in FIG. 5, backup client 92 also creates a directory TEMP on disk 26 for temporarily storing backup copies of transaction log extents retrieved from backup memory system 42 via backup server 40. In step 106, backup client 92 generates a request for backup copies of transaction log extents TLEx-TLE(x+3). Backup client 92 also sends the request it generates to backup server 40. For purposes of explanation, it will be presumed backup client 92 generates and sends to server 40 a single request for transaction log extents TLEx–TLE(x+3). In an alternative embodiment, backup client 92 may generate and send to server 96 a sequence of four requests for backup copies of the transaction log extents TLEx-TLE(x+3), respectively. The present invention will be described with reference to backup client 92 generating and sending a single request to server 40 for the backup copies of transaction log extents TLEx-TLE(x+3).

Figure 6:
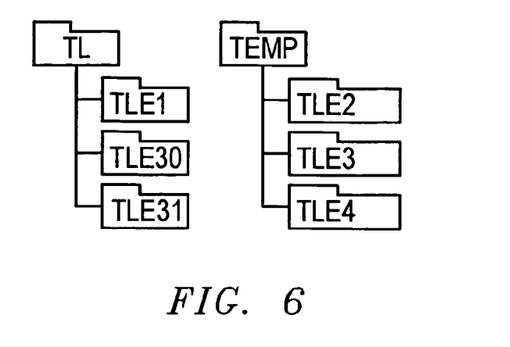
FIG. 6 illustrates contents directories TL and TEMP.

Software executing on backup server 40 and operating in conjunction with backup memory system, responds to client 92's request and returns the backup copies of transaction log extents TLEx-TLE(x+3) to backup client 92. In step 110, backup client 92 adds the received backup copies TLEx-TLE (x+3) to directory TEMP. In step 112, backup client 92 restores transaction log extent TLEn by moving TLEx from directory TEMP to directory TL. FIG. 6 illustrates the contents directories TL and TEMP after implementing steps 102-112 in response to client 92 receiving a request from database manager 94 to restore TLE1 in step 100. Once TLEn is restored to directory TL, backup client 92 notifies database manager 20 so that logged transactions in restored TLEn, beginning with transaction Tm, can be replayed in accordance with step 66 of FIG. 3.

After backup client 92 restores TLEn to directory TL in step 112, backup client 92 enters a mode in which it waits for the next transaction log extent restoration request from database manager 20 or a confirmation from database manager 20 that Database A has been recovered as shown in steps 114 and 116. It is noted that during the initial waiting period, directory TEMP contains three additional transaction log extents TLE (x+1)-TLE(x+3) that can be used by database manager during the recovery process of Database A. Presume database manager 94 replays all logged transactions contained within restored TLEn. In accordance with step 60 of the process shown in FIG. 3, database manager 20 will then generate another request for restoration of transaction log extent TLEn after database manager 94 increments n by 1. Once this request is received by backup client 92 during the wait period defined by steps 114 and 116, backup client 92 responds by moving the requested transaction log extent TLEn from directory TEMP to directory TL in accordance with step 120. Importantly, backup client 92 need not generate and send a corresponding request for transaction log extent TLEn to backup server 40. Rather, the requested transaction log extent preexists within directory TEMP.

Figure 7:
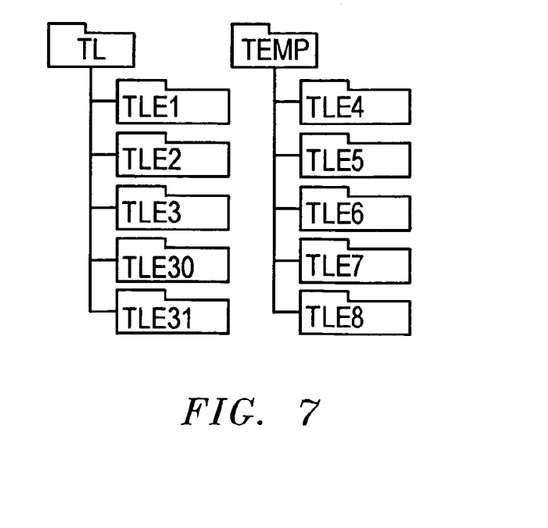
FIG. 7 illustrates directories TL and TEMP of FIG. 6 after implementing steps 120-132 of FIG. 5.

Backup client 92 is capable of prefetching additional transaction log extents stored as backup copies in backup memory system 42 while logged transactions are replayed in step 66 of the recovery process shown in FIG. 3. To this end, backup client 92 may track the number of transaction log extents which have been moved from directory TEMP to director TL. When a predetermined number of transaction log extents remain in directory TEMP which have yet to be moved to directory TL, backup client 92 generates and sends a request for additional transaction log extents to server 40. In one embodiment, the decision to generate and send a request for additional transaction log extents is made in step 122 when backup client 92 compares variably y with n, where variable n identifies the last transaction log extent requested by database manager 94 (see step 116). If y does not equal n, there is no need to prefetch additional transaction log extents from backup server 40 at that time. However, if y equals n in step 122, backup client 92 increments x by 4 in step 124 and increments y by 2 in step 126. Thereafter, backup client 92 generates and sends a request for backup copies TLEx-TLE (x+3). In step 132, backup client 92 receives the requested backup copies TLEx-TLE(x+3) from backup server 40. Backup client 92 stores these received transaction log extents under directory TEMP. FIG. 7 illustrates directories TL and TEMP of FIG. 6 after implementing steps 120-132 in response to client 92 receiving a request in step 116 to restore TLE3. Again, it is noted that process steps 122-132 can be implemented while database manager 20 continues the recovery process shown within FIG. 3.

Eventually, database manager 94 will inform backup client 92 that Database A has been recovered to the data state that existed prior to corruption, and the process of FIG. 5 ends. However, before the process of FIG. 5 ends, backup client 92 removes either directory TEMP from disk 26, or alternatively, deletes existing transaction log extents within directory TEMP. In an alternative embodiment, backup client 92 may terminate any request generated in step 130 that has yet to complete in response to a determination that Database A has been recovered.

Some or all of the steps performed in the process of FIG. 5 may be implemented by daemon/service within backup client 92. This daemon/service may be initialized by backup client when the database manager 94 first starts the recovery process of FIG. 3. Further, a plug-in specific to database manager 94 can be employed in backup client 92 to enable database manager 94 to cooperate with client 92 along the lines described above. The plug-in may also enable the backup client to customize the process shown in FIG. 5 by, for example, setting the value added to y in steps 104 and 126, setting the number of backup copies of transaction log extents to retrieve in step 106, or setting the value added to x in step 124.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method of recovering a target data object, the method comprising:
   a first computer system restoring the target data object to a data state that existed at a point of time,
   retrieving a first object from a backup memory via a second computer system, wherein the retrieved first object is stored in memory that is local to the first computer system, and wherein the first object comprises a plurality of transactions for modifying the target data object;
   after the target data object is restored, the first computer system modifying the target data object in accordance with the transactions of the retrieved first object;
   retrieving a second object from the backup memory via the second computer system, wherein the retrieved second object is stored in the memory that is local to the first computer system, wherein the second object comprises a plurality of transactions for modifying the target data object, and wherein the second object is retrieved from the backup memory while the target data object is modified in accordance with the transactions of the first object.

2. The method of claim 1 further comprising:
   retrieving n objects from the backup memory, wherein the second object is one of the n objects.

3. The method of claim 2 wherein the n objects are retrieved from the backup memory while the target data object is being modified in accordance with the transactions of the first object.

4. The method of claim 1 further comprising:
generating a request to restore an object to the local memory, wherein
the object comprises a plurality of transactions for modifying the target data object,
retrieving the object from the backup memory in response to generation of the request to restore the object to the local memory;
generating a request to restore the first object to local memory, wherein
the request to restore the first object is generated after retrieving the first object from the backup memory.

5. The method of claim 1 wherein the first object comprises a database transaction log extent.

6. The method of claim 1 further comprising an act of generating a request to restore the first object to a first directory of a file system, wherein the first object is retrieved from the backup memory in response to generating the request to restore the first object.

7. The method of claim 6 wherein the first object is moved from a second directory to the first directory while the target data object is modified in accordance with the transactions of the first object.

8. The method of claim 1 wherein the backup memory comprises backup tapes on which the first and second objects are stored.

9. The method of claim 1, wherein the method further comprises:
adding the first object to a temporary memory, wherein
the temporary memory stores objects retrieved from backup memory until the objects are restored to the local memory, and
the local memory is accessible for modifying the target data object.

10. A computer readable memory that stores instructions executable by a computer system, wherein the computer system implements a method in response to executing the instructions, the method comprising:
restoring a target data object to a data state that existed at a point of time prior to restoring the target data object;
retrieving a first object from a backup memory to memory local to the computer system, wherein the first object comprises a first plurality of transactions for modifying the target data object;
after the target data object is restored, modifying the target data object in accordance with the transactions of the first object;
retrieving a second object from the backup memory to the memory local to the computer system, wherein
the second object comprises a second plurality of transactions for modifying the target data object, and
the second object is retrieved from the backup memory while the target data object is modified in accordance with the transactions of the first object.

11. The computer readable memory of claim 10 wherein the method further comprises:
retrieving n objects from the backup memory, wherein the second object is one of the n objects.

12. The computer readable memory of claim 11 wherein the n objects are retrieved from the backup memory while the target data object is being modified in accordance with the transactions of the first object.

13. The computer readable memory of claim 10 wherein the method further comprises:
generating a request to restore an object to local memory, wherein
the object comprises a plurality of transactions for modifying the target data object,
generating a request to restore the first object to local memory, wherein
the request to restore the first object is generated after retrieving the first object from the backup memory.

14. The computer readable memory of claim 10 wherein the first object comprises a database transaction log extent.

15. The computer readable memory of claim 10 wherein the method further comprises an act of generating a request to restore the first object to a first directory of a file system, wherein the first object is retrieved from the backup memory in response to generating the request to restore the first object.

16. The computer readable memory of claim 15 wherein the first object is moved from a second directory to the first directory before the target data object is modified in accordance with the transactions of the first object.

17. The computer readable memory of claim 10, wherein the method further comprises:
adding the first object to a temporary memory, wherein
the temporary memory stores objects retrieved from backup memory until the objects are restored to a local memory, and
the local memory is accessible for modifying the target data object.

18. A system comprising:
a first server coupled to a backup memory system and a data storage system, wherein
the first sever comprises a memory that stores instructions, and
the first server implements a method for recovering a target data object stored in the data storage system in response to executing the instructions, the method comprising:
restoring the target data object to a data state that existed at a point of time prior to restoring the target data object;
retrieving a first object from a backup memory to a memory local to the first server, wherein the first object comprises a plurality of transactions for modifying the target data object;
after the target data object is restored, modifying the target data object in accordance with the transactions of the first object; and
retrieving a second object from the backup memory to the memory local to the first server, wherein
the second object comprises a plurality of transactions for modifying the target data object, and
the second object is retrieved from the backup memory while the target data object is modified in accordance with the transactions of the first object.

19. The system of claim 18, wherein the first server implements a method further comprising:
adding the first object to a temporary memory, wherein
the temporary memory stores objects retrieved from backup memory until the objects are restored to a local memory, and
the local memory is accessible for modifying the target data object.

20. A method of recovering a target data object, the method comprising:
a first computer system restoring the target data object to a data state that existed at a point of time;
retrieving a first object from a backup memory via a backup server, wherein the first object comprises a plurality of transactions for modifying the target data object;

adding the first object to a temporary memory, wherein
the temporary memory stores objects retrieved from backup memory until the objects are restored to a local memory, and
the local memory is accessible for modifying the target data object;
restoring the first object to the local memory by moving the first object from temporary memory to local memory;
after the target data object is restored, modifying the target data object in accordance with the transactions of the first object;
retrieving a second object from the backup memory, wherein
the second object comprises a plurality of transactions for modifying the target data object, and
the second object is retrieved from the backup memory while the target data object is modified in accordance with the transactions of the first object;
adding the second object to the temporary memory;
if the target data object is not recovered by the transactions of the first object, restoring the second object to the local memory by moving the second object from temporary memory to the local memory; and
modifying the target data object in accordance with transactions of the second object.

21. A method of recovering a target data object, the method comprising:
a first server restoring the target data object to a data state that existed at a prior point in time
retrieving a first object from a backup memory via a backup server, wherein the first object comprises a plurality of transactions for modifying the target data object;
modifying the target data object in accordance with the transactions of the first object;
retrieving a plurality of objects from the backup memory, wherein
each of the plurality of objects comprises a plurality of transactions for modifying the target data object, and
each of the plurality of objects is retrieved from the backup memory while the target data object is modified in accordance with the transactions of the first object;
storing the retrieved plurality of objects in a temporary memory;
tracking the number of objects in a temporary memory; and
if the number of objects in a temporary memory reaches a predetermined number of objects, retrieving additional objects from the backup memory and storing the additional objects in the temporary memory.

* * * * *